United States Patent
Classen et al.

(10) Patent No.: US 8,429,971 B2
(45) Date of Patent: Apr. 30, 2013

(54) MULTIAXIAL MICROMECHANICAL ACCELERATION SENSOR

(75) Inventors: Johannes Classen, Reutlingen (DE); Axel Franke, Ditzingen (DE); Dietrich Schubert, Reutlingen (DE); Kersten Kehr, Zwota (DE); Ralf Reichenbach, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 12/308,632

(22) PCT Filed: Nov. 14, 2007

(86) PCT No.: PCT/EP2007/062307
§ 371 (c)(1),
(2), (4) Date: Apr. 4, 2011

(87) PCT Pub. No.: WO2008/080683
PCT Pub. Date: Jul. 10, 2008

(65) Prior Publication Data
US 2011/0174076 A1    Jul. 21, 2011

(30) Foreign Application Priority Data
Dec. 27, 2006    (DE) .......................... 10 2006 062 314

(51) Int. Cl.
*G01P 15/125*    (2006.01)
(52) U.S. Cl.
USPC ..................................... 73/514.32; 73/514.38
(58) Field of Classification Search ............... 73/514.32, 73/514.36, 514.38, 514.29, 514.16, 510
See application file for complete search history.

(56) References Cited

U.S. PATENT DOCUMENTS

| | | | |
|---|---|---|---|
| 5,492,020 A * | 2/1996 | Okada | 73/862.626 |
| 6,378,381 B1 * | 4/2002 | Okada et al. | 73/862.043 |
| 7,194,905 B2 * | 3/2007 | Yamamoto et al. | 73/514.32 |
| 7,430,915 B2 * | 10/2008 | Yasuda et al. | 73/652 |
| 7,501,835 B2 * | 3/2009 | Fujiyoshi et al. | 324/662 |
| 7,578,189 B1 * | 8/2009 | Mehregany | 73/514.18 |
| 7,600,428 B2 * | 10/2009 | Robert et al. | 73/514.32 |

FOREIGN PATENT DOCUMENTS

| | | |
|---|---|---|
| EP | 1 635 180 | 3/2006 |
| FR | 2 689 642 | 10/1993 |
| FR | 2 885 410 | 11/2006 |
| WO | WO 2006/033269 | 3/2006 |

* cited by examiner

*Primary Examiner* — Helen C. Kwok
(74) *Attorney, Agent, or Firm* — Kenyon & Kenyon LLP

(57) ABSTRACT

A micromechanical acceleration sensor includes a substrate, an elastic diaphragm which extends parallel to the substrate plane and which is partially connected to the substrate, and which has a surface region which may be deflected perpendicular to the substrate plane, and a seismic mass whose center of gravity is situated outside the plane of the elastic diaphragm. The seismic mass extends at a distance over substrate regions which are situated outside the region of the elastic diaphragm and which include a system composed of multiple electrodes, each of which together with oppositely situated regions of the seismic mass forms a capacitor in a circuit. In its central region the seismic mass is attached to the elastic diaphragm in the surface region of the elastic diaphragm which may be deflected perpendicular to the substrate plane.

10 Claims, 4 Drawing Sheets

MULTIAXIAL MICROMECHANICAL ACCELERATION SENSOR

BACKGROUND OF THE INVENTION

1. Field of the Invention

The present invention relates to a micromechanical acceleration sensor for detecting accelerations in multiple axes, which acceleration sensors may be used as inertial sensors in safety systems, in particular for motor vehicles.

2. Description of Related Art

Micromechanical acceleration sensors are often designed as mass-spring systems for capacitive evaluation of the deflections of a seismic mass caused by mechanical forces or torques that are present. To this end, pairs of electrodes are provided which include electrodes that are either fixedly connected to a substrate or connected to a seismic mass, and which generally form plate capacitors whose capacitance is a function of the deflection of the seismic mass. For sensor elements which measure accelerations parallel to the plane of the sensor element substrate, the seismic mass is usually suspended in the same plane in which the center of gravity of the seismic mass is situated, so that when an acceleration occurs in this plane the seismic mass is also deflected in this plane.

It is known that the influence of stress effects via the substrate on the measured signal decreases when the suspension of the seismic mass or the suspensions of multiple seismic masses, and optionally also the electrodes fixedly connected to the substrate, are close together. For conventional sensor elements which convert accelerations acting parallel to the plane of the substrate or wafer into deflections of seismic masses in the same plane, such a central suspension of movable structures and fixed detection electrodes, which is desirable for reducing the sensitivity of the sensor to stress, results in a topology-dependent manner in a reduction of the detection capacitances for sensors having such a design in current processing methods.

For sensors designed to detect accelerations in multiple axes, it is known to provide a separate mass-spring system for each axis, which results in a corresponding increase in the space requirements for such sensors. This adversely affects the chip surface area requirements and therefore the manufacturing costs, and because of the unavoidable increase in component size sometimes represents a competitive disadvantage.

It is also known to provide multiaxial acceleration sensors with a seismic mass which is used to measure accelerations in multiple directions in combination with a relatively centrally situated suspension. These systems are based on the suspension of the seismic mass by use of multiple radially extending connecting bars which allow a suspended bearing of the seismic mass. Thus far, however, it has been possible to manufacture these types of systems only in complex volume micromechanical processes, making such systems correspondingly costly.

BRIEF SUMMARY OF THE INVENTION

An object of the present invention is to provide a micromechanical acceleration sensor which requires less manufacturing complexity compared to volume micromechanical processes, and which allows detection of accelerations in multiple axes, with small space requirements and low sensitivity to stress with regard to interfering effects via the substrate.

The present invention provides a micromechanical acceleration sensor having a substrate, an elastic diaphragm which extends parallel to the substrate plane and which is partially connected to the substrate, a surface region which may be deflected perpendicular to the substrate plane, and a seismic mass whose center of gravity is situated outside the plane of the elastic diaphragm, the seismic mass on the substrate side having a flat surface which extends over substrate regions which are situated outside the region of the elastic diaphragm and which include a system composed of multiple electrodes. In the rest state the flat surface of the seismic mass extends parallel to this system of multiple electrodes, each of which together with the oppositely situated regions of the seismic mass forms a capacitor in a circuit. In its central region the seismic mass is attached to the elastic diaphragm in the surface region of the elastic diaphragm which may be deflected perpendicular to the substrate plane. The distance between the seismic mass and the electrodes is such that the seismic mass is able to deflect properly.

The extension of the seismic mass at a distance in front of substrate regions provided with electrodes allows the distance between the individual electrodes and the oppositely situated surface regions of the seismic mass to be changed, which results in corresponding changes in capacitance. As the result of shifting the center of gravity of the seismic mass in front of the elastic diaphragm, which at the same time specifies the position of the suspension of the seismic mass, the seismic mass is deflected (tilted) from the substrate plane or parallel planes when accelerations occur parallel to the substrate plane. Due to the attachment of the seismic mass to an elastic diaphragm, at the same time a central suspension of the seismic mass may be achieved without having to accept a topology-based reduction in the detection capacitances. This type of sensor according to the present invention is characterized by the absence of a preferred direction for the acceleration-induced tipping of the seismic mass. As a result, the sensor is able to detect accelerations in two spatial directions, it being possible to make combined use of the seismic mass, the suspension thereof over an elastic diaphragm, and, for an appropriate electrode configuration, also the electrodes which form the measuring capacitors in order to carry out detection in two directions. For electrodes extending in parallel on the substrate and the corresponding oppositely situated surface regions of the seismic mass, a smaller base distance between the substrate and the seismic mass, and therefore a high detection capacitance with relatively low space requirements, may be realized.

The individual changes in capacitance during tilting of the seismic mass are associated with corresponding acceleration components in an evaluation circuit. An advantageous and relatively simple evaluation may be performed when the seismic mass has at least two axes of symmetry, parallel to the substrate plane, in the detection directions. It is also advantageous when the overlapping regions between the electrodes and the oppositely situated regions of the seismic mass likewise have two axes of symmetry, parallel to the substrate plane, in the detection directions.

Both of these aspects may be realized in a particularly advantageous manner when the electrodes are radially symmetrically situated about the attachment region of the seismic mass on the substrate.

A particularly symmetrical and easily evaluated response characteristic of a micromechanical acceleration sensor according to the present invention results when the surface region of the elastic diaphragm which may be deflected perpendicular to the substrate plane is the surface region in which the seismic mass is attached to the elastic diaphragm, and the seismic mass itself and the electrode system each have two axes of symmetry, parallel to the substrate plane, in the detection directions, the intersection points of the axes of symmetry being superposed perpendicular to the substrate plane. Here as well, a radially symmetrical design of the particular surface regions is particularly advantageous.

For the detection of the two acceleration components in the substrate plane and for a simple evaluation, it is advantageous when four electrodes are provided, in a manner according to the present invention, on the substrate outside the elastic diaphragm.

It is practical for the four electrodes to be the same size, the separation regions between the individual electrodes also having a radially symmetrical design.

It is particularly advantageous for the seismic mass to include a flat plate which extends parallel to the substrate, the extension of the flat plate in a manner geometrically similar to the electrodes on the substrate essentially specifying the sensitivity and the size of the acceleration sensor.

To avoid excessively large etching undercut widths, it is advantageous for process-related reasons to design the micromechanical acceleration sensor in such a way that the elastic diaphragm is connected to the substrate in a central region, and the surface region in which the elastic diaphragm may be deflected perpendicular to the substrate plane, the surface region in which the seismic mass is attached to the elastic diaphragm, and the flat plate of the seismic mass which extends parallel to the substrate are radially symmetrically situated about this central region in which the elastic diaphragm is connected to the substrate. In this case it is advantageous for the central region of the seismic mass to have a trench which leads to a perforated region of the elastic diaphragm. The undercut etching of the elastic diaphragm to ensure that the surface region of the elastic diaphragm is deflectable perpendicular to the substrate plane, as required according to the present invention, is carried out through the trench in the seismic mass and the perforated diaphragm region.

DETAILED DESCRIPTION OF THE INVENTION

Figure 1:
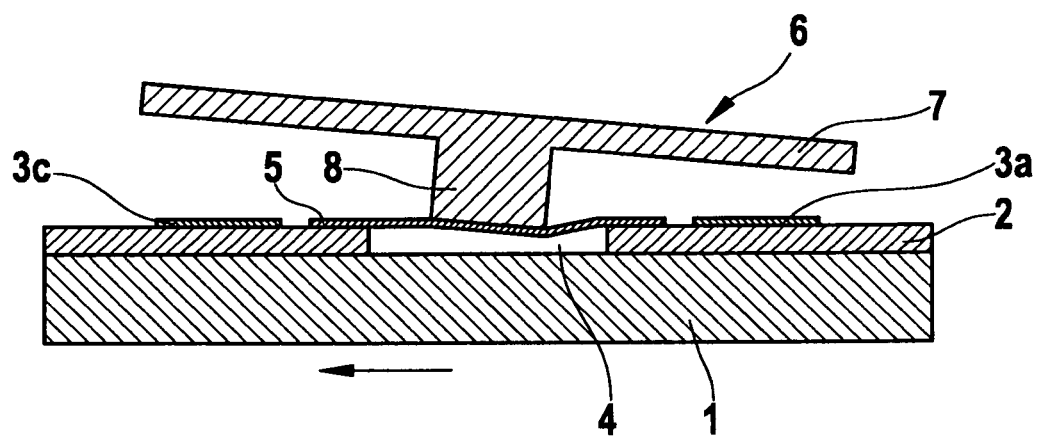
FIG. 1 shows a schematic sectional illustration of an acceleration sensor according to the present invention, perpendicular to the substrate plane.

FIG. 1 shows a schematic sectional illustration of an acceleration sensor according to the present invention, perpendicular to the substrate plane. This acceleration sensor includes a substrate 1; an insulation layer 2, situated on substrate 1, on which four planar electrodes are provided, of which two electrodes 3a, 3c are visible in the illustration; a cutout central region 4 in insulation layer 2 which is spanned by an elastic diaphragm 5; and a seismic mass 6 which is composed essentially of a rotationally symmetrical flat plate 7 and whose center of gravity is situated considerably outside the plane of elastic diaphragm 5. The edge region of elastic diaphragm 5 is connected to insulation layer 2, and thus at the same time is fixedly connected to substrate 1. At the same time, cutout central region 4 in insulation layer 2 defines a surface region of elastic diaphragm 5 which may be deflected perpendicular to the plane of the substrate or of the diaphragm. A base 8 situated in the central region of seismic mass 6 projects from flat plate 7 of seismic mass 6 and specifies the distance between the center of gravity of seismic mass 6 and elastic diaphragm 5, and at the same time forms the fastening means by which seismic mass 6 is attached to elastic diaphragm 5, specifically, in the deflectable region thereof. FIG. 1 also indicates the tilting of seismic mass 6 according to the present invention when acted on by an acceleration in the direction of the arrow, which results in a change in the distance between individual electrodes 3a, 3c and the oppositely situated surface regions of plate 7 of seismic mass 6.

Figure 2A:
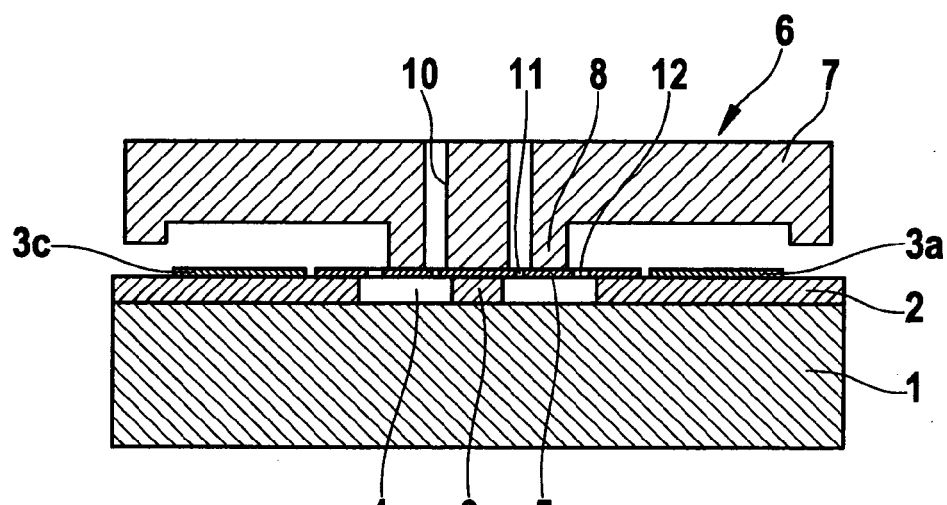
FIG. 2 shows a sectional illustration and a top view of an acceleration sensor according to the present invention, with a central attachment of the elastic diaphragm.
Figure 2B:
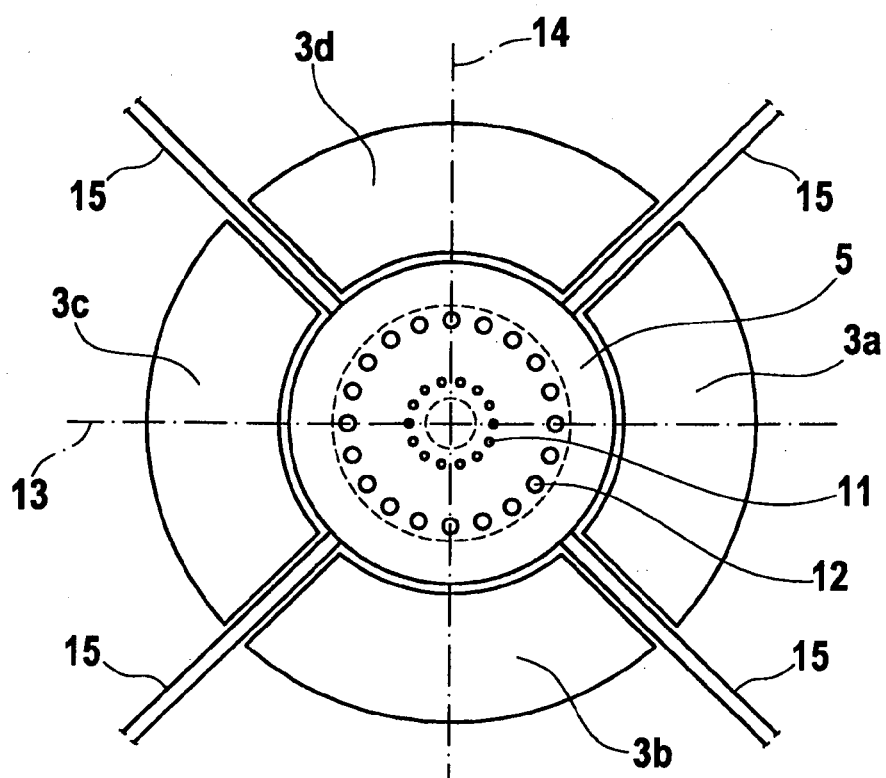

FIG. 2 shows a sectional illustration and a top view of an acceleration sensor according to the present invention, having central support of elastic diaphragm 5. The sensor is radially symmetrically situated parallel to the plane of the wafer, and in a particularly advantageous manner thus fulfills symmetry-related geometric boundary conditions for a multiaxial acceleration measurement. The illustrated sensor configuration may be manufactured without significant modifications, using customary surface micromechanical processes on the basis of silicon. To avoid excessively large etching undercut widths and instability, a support 9 has been left in the central region of elastic diaphragm 5 which electrically insulates elastic diaphragm 5 on substrate 1. The region of elastic diaphragm 5 which is deflectable perpendicular to the substrate plane is correspondingly located outside the region of remaining support 9, and radially symmetrically surrounds the attachment region defined by this support 9. The outer boundary of the region which is deflectable perpendicular to the substrate plane is formed by the connection of elastic diaphragm 5 to insulation layer 2. A base 8 provided on elastic diaphragm 5 projects from flat plate 7 of seismic mass 6, and determines the distance between seismic mass 6 and elastic diaphragm 5 and at the same time forms the fastening means by which seismic mass 6 is attached to elastic diaphragm 5. Perpendicular to the substrate plane an annular, radially symmetrical trench 10 passes through flat plate 7 of seismic mass 6 and base 8 until reaching elastic diaphragm 5. As a result of trench 10, elastic diaphragm 5 has openings 11 which are used as perforations for the most effective undercut etching of elastic diaphragm 5 possible. To ensure the intended movability of seismic mass 6, the inner border of trench 10 is situated outside the outer border of remaining support 9. At the same time, trench 10 has a width which does not hinder an expected maximum tilting of seismic mass 6. Outside the connecting region between base 8 and elastic diaphragm 5, elastic diaphragm 5 has additional openings 12 in the form of another perforated region, via which the elastic diaphragm is connected to insulation layer 2. Annular trench 10 results in an annular connection of flat plate 7 to elastic diaphragm 5 via base 8, the remaining ring of base 8 being narrow enough to ensure the required undercut etching of elastic diaphragm 5, since a perforation in the diaphragm for etching through is not possible in the contact region between base 8 and elastic diaphragm 5. On the other hand, base 8 is strong enough for its rigidity to ensure that the deflection (tilting) of seismic mass 6 occurs only due to the deformation in elastic diaphragm 5. To allow the rigidity of the movable suspension of seismic mass 6 to be specified by the section of elastic diaphragm 5 located inside base 8 on the floor of trench 10, this section has a much more rigid design compared to elastic diaphragm 5 situated outside base 8. Since annular trench 10 may be structured very precisely, this results in an elastic response of the sensor system which may be reliably defined. The associated top view shows the plane of electrodes 3a, 3b, 3c, 3d and elastic diaphragm 5, which for process-related reasons are provided in a so-called plane of buried polysilicon. Also shown are two axes of symmetry 13, 14 which extend parallel to detection directions x and y and intersect at the midpoint of diaphragm 5. Seismic mass 6 is likewise electrically connected via elastically deflectable diaphragm 5, which in its edge region merges into printed conductors 15 which pass through between electrodes 3a, 3b, 3c, 3d. This illustration clearly shows openings 11, 12 in the two perforated regions of elastic diaphragm 5. Shown in dashed lines are the boundaries of the regions within which support 9 and insulation layer 2 are located, and which at the same time demarcate the boundaries of the region in which diaphragm 5 may be deflected.

Figure 3A:
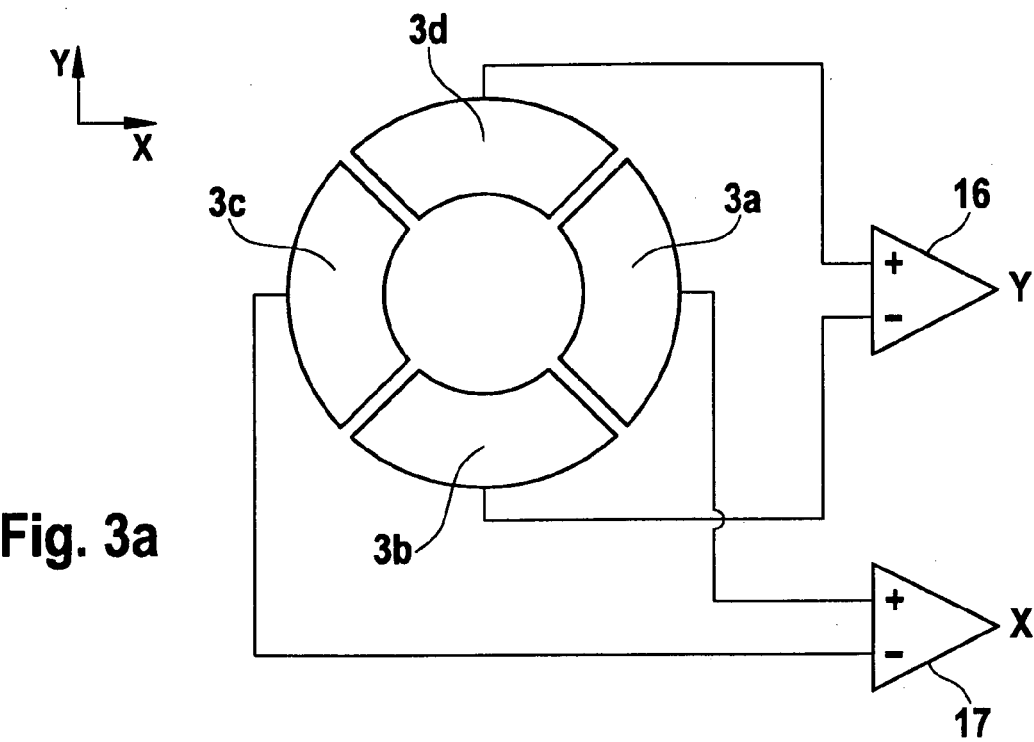
FIG. 3a shows an illustration of an example of circuitry of an electrode system according to the present invention.
Figure 3B:
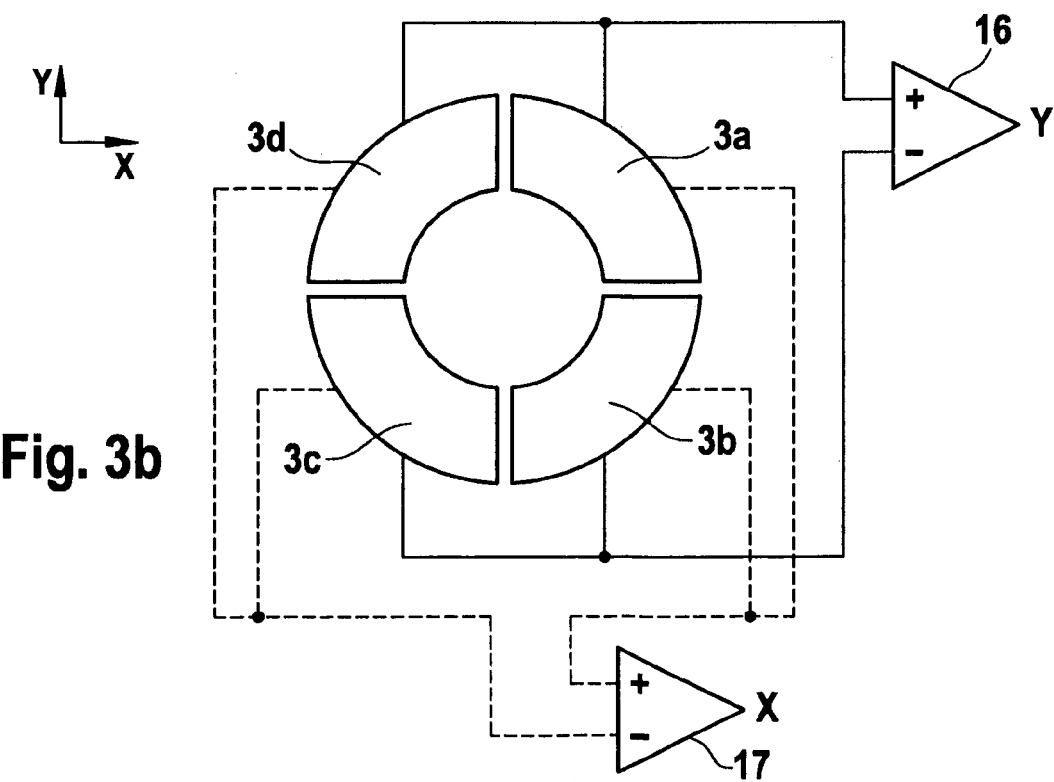
FIG. 3b shows an alternative electrode system

FIG. 3a shows an illustration of one example of circuitry for an electrode system according to the present invention. In principle, embodiments having circular, rectangular, or square seismic masses and geometrically similar electrode systems are possible, it also being possible to use sensors according to the present invention as one-dimensional acceleration sensors. However, a particularly high degree of symmetry, and thus a particularly high directional dependency at the location of use, results for radially symmetrical electrode systems. FIGS. 3a and 3b show two electrode systems of this type, each composed of four individual electrodes 3a, 3b, 3c, 3d of equal size. Each of electrodes 3a, 3b, 3c, 3d surrounds the center of symmetry of the electrode system at an angle of approximately 90°. Electrodes 3a, 3b, 3c, 3d are insulated from one another via radially extending separation regions. The difference between the two systems lies in the orientation of the radial separation regions relative to the components of the acceleration to be detected (illustrated using a stylized coordinate system), which ultimately is determined by requirements of the particular evaluation circuits and algorithms used. For capacitive reading of the capacitors formed via individual electrodes 3a, 3b, 3c, 3d in cooperation with the seismic mass, two configurations are provided in which the radially extending separation regions are either offset by 45° relative to the acceleration components to be measured or extend parallel to these components. In the first case, the individual directions are evaluated by evaluating in each case the two oppositely situated capacitances for determination of an acceleration component. In the present example, the acceleration in the X direction is determined using the quotient $(C_{3a}-C_{3c})/(C_{3a}+C_{3c})$, and the acceleration in the Y direction is determined using the quotient $(C_{3b}-C_{3d})/(C_{3b}+C_{3d})$ as a measure of the acceleration which is present. After appropriate signal amplification, the particular quotients are evaluated using integrated evaluation and amplification circuits 16, 17. In the case of separation regions radially extending between electrodes 3a, 3b, 3c, 3d and parallel to the acceleration components according to FIG. 3b, in each case all four capacitances must be taken into consideration for determining an acceleration component, which is carried out optionally using time-staggered evaluation of the individual variables, and using quotients $((C_{3a}+C_{3b})-(C_{3c}+C_{3d}))/(C_{3a}+C_{3b}+C_{3c}+C_{3d})$ for the acceleration in the X direction and $((C_{3b}+C_{3c})-(C_{3d}+C_{3a}))/(C_{3a}+C_{3b}+C_{3c}+C_{3d})$ for the acceleration in the Y direction. The circuit variant illustrated by dashed lines must be implemented in a manner which is shifted in time with respect to the circuit variant illustrated by continuous printed conductors.

Figure 4:
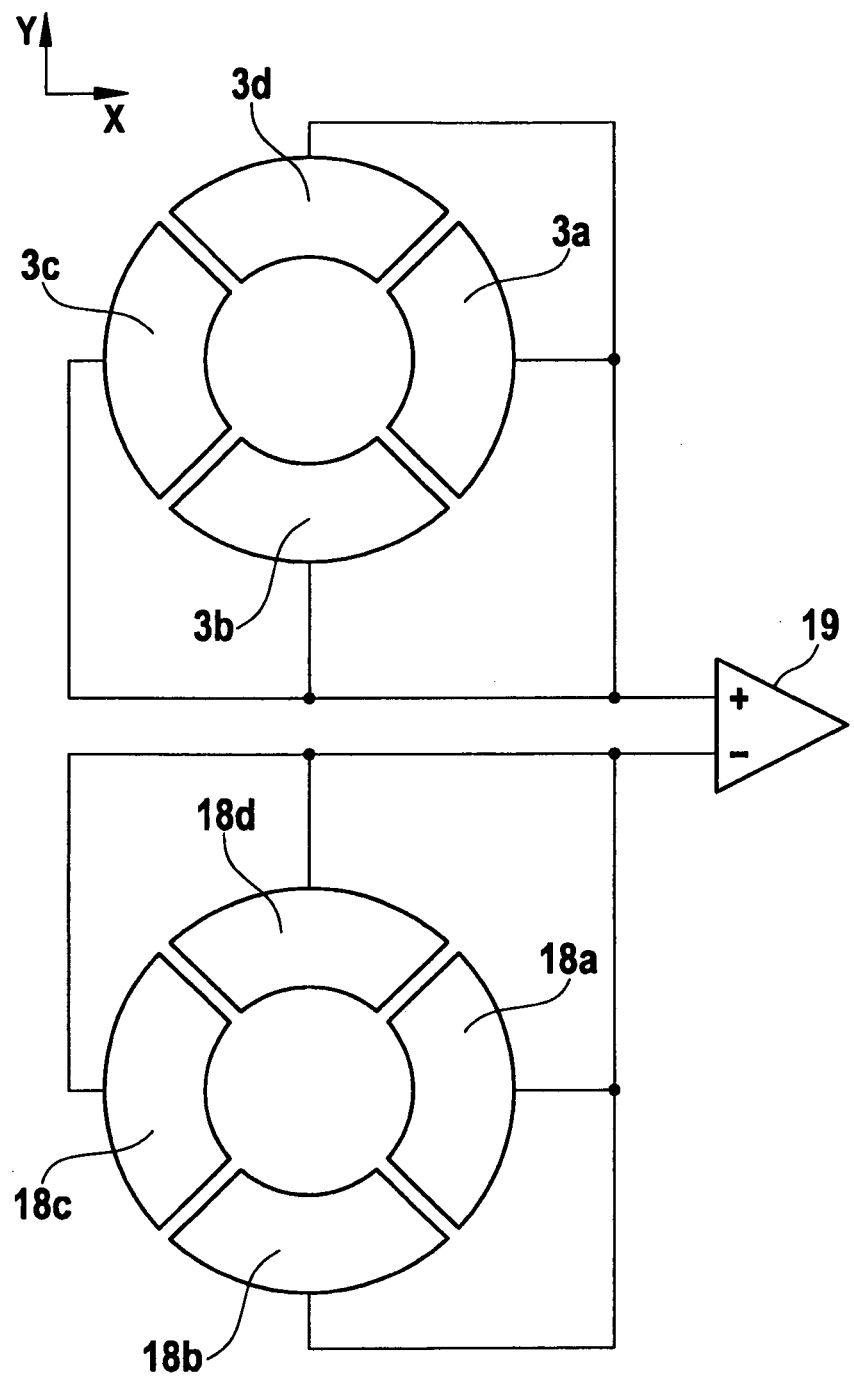
FIG. 4 shows an illustration of an example of circuitry of an electrode system according to the present invention having reference electrodes.

FIG. 4 shows an illustration of one example of circuitry for an electrode system 3a, 3b, 3c, 3d according to the present invention having reference electrodes 18a through 18d. For evaluation of all four capacitances, use of a reference capacitance results in the additional possibility of determining accelerations occurring perpendicular to the substrate plane. The sum of all capacitances in the rest position of seismic mass 6 ($C_{ref}=C_{3a,0}+C_{3b,0}+C_{3c,0}+C_{3d,0}$) may be used as reference capacitance $C_{ref}$ the third acceleration component to be measured being evaluated using the term $C_{3a}+C_{3b}+C_{3c}+C_{3d}-C_{ref}$. Use of separate reference electrodes 18a through 18d reduces the complexity of circuitry for evaluation and determination of the acceleration component perpendicular to the substrate plane, while at the same time improving the quality of evaluation. However, a portion of the gained space must be sacrificed due to the use of sensors according to the present invention having an individual seismic mass 6, since reference electrodes 18a through 18d are geometrically identical to electrode system 3a, 3b, 3c, 3d, but must be laterally offset outside the region of seismic mass 6 and must be situated opposite a rigid reference surface. The evaluation is carried out using once again a corresponding evaluation and amplification circuit 19.

What is claimed is:

1. A micromechanical acceleration sensor, comprising:
a substrate having a substrate plane;
an elastic diaphragm having a diaphragm plane and extending parallel to the substrate plane and at least partially connected to the substrate, wherein the diaphragm has a surface region, delimited by an outer periphery, configured to be deflected perpendicular to the substrate plane; and
a seismic mass having a center of gravity situated outside the diaphragm plane, wherein the seismic mass extends at a distance over regions of the substrate situated outside the outer periphery of the surface region of the elastic diaphragm, wherein a system composed of multiple electrodes is provided on the regions of the substrate situated outside the outer periphery of the surface region of the elastic diaphragm and coplanar with the diaphragm plane, each electrode and a corresponding oppositely situated region of the seismic mass forming a capacitor in a circuit, and wherein a central region of the seismic mass is attached at an attachment region to the elastic diaphragm in the surface region of the elastic diaphragm configured to be deflected perpendicular to the substrate plane.

2. The micromechanical acceleration sensor as recited in claim 1, wherein the seismic mass and overlapping regions between the multiple electrodes and the corresponding oppositely situated regions of the seismic mass have at least two axes of symmetry extending parallel to the substrate plane and in detection directions.

3. The micromechanical acceleration sensor as recited in claim 2, wherein the multiple electrodes are situated radially symmetrically about the attachment region of the seismic mass.

4. The micromechanical acceleration sensor as recited in claim 2, wherein each of (a) the surface region of the elastic diaphragm configured to be deflected perpendicular to the substrate plane, (b) the attachment region in which the seismic mass is attached to the elastic diaphragm, (c) the seismic mass and (d) the system of multiple electrodes, has at least two axes of symmetry extending parallel to the substrate plane and in detection directions, and wherein each point of intersection between the at least two axes of symmetry is superposed perpendicular to the substrate plane.

5. The micromechanical acceleration sensor as recited in claim 2, wherein four electrodes are provided on the substrate outside the outer periphery of the elastic diaphragm.

6. The micromechanical acceleration sensor as recited in claim 5, wherein the four electrodes are radially symmetrically situated.

7. The micromechanical acceleration sensor as recited in claim 2, wherein the seismic mass includes a flat plate which extends parallel to the substrate.

8. The micromechanical acceleration sensor as recited in claim 2, wherein:
 the seismic mass has a flat plate extending parallel to the substrate;
 the elastic diaphragm is connected to the substrate in a central portion of the surface region of the elastic diaphragm; and
 the surface region of the elastic diaphragm configured to be deflected perpendicular to the substrate plane, the attachment region of the seismic mass attached to the elastic diaphragm, and the flat plate of the seismic mass extending parallel to the substrate are radially symmetrically situated about the central portion of the surface region of the elastic diaphragm in which the elastic diaphragm is connected to the substrate.

9. The micromechanical acceleration sensor as recited in claim 1, wherein the central region of the seismic mass has an annular trench which leads to a perforated region of the elastic diaphragm.

10. The micromechanical acceleration sensor as recited in claim 1, wherein reference electrodes are situated laterally offset outside an outer periphery of the seismic mass, the reference electrodes having a geometrically identical pattern to the system composed of multiple electrodes.

* * * * *